(12) United States Patent
Ko et al.

(10) Patent No.: US 8,596,851 B2
(45) Date of Patent: Dec. 3, 2013

(54) LAMP SOCKET, BACKLIGHT ASSEMBLY HAVING THE SAME AND DISPLAY DEVICE HAVING THE SAME

(75) Inventors: Kyung-Rok Ko, Suwon-si (KR); Jae-Hwan Chun, Suwon-si (KR)

(73) Assignee: Samsung Display Co., Ltd. (KR)

( * ) Notice: Subject to any disclaimer, the term of this patent is extended or adjusted under 35 U.S.C. 154(b) by 378 days.

(21) Appl. No.: 12/652,696

(22) Filed: Jan. 5, 2010

(65) Prior Publication Data
US 2010/0195312 A1 Aug. 5, 2010

(30) Foreign Application Priority Data
Feb. 5, 2009 (KR) .................. 10-2009-0009340

(51) Int. Cl.
*H01R 33/08* (2006.01)
*F21V 19/00* (2006.01)
(52) U.S. Cl.
USPC ........... 362/614; 362/97.1; 362/260; 362/634
(58) Field of Classification Search
USPC .................. 362/614, 634, 97.1, 97.2, 217.08, 362/217.09, 260, 652, 656; 439/239
See application file for complete search history.

(56) References Cited

U.S. PATENT DOCUMENTS

| | | | |
|---|---|---|---|
| 7,086,775 B2 * | 8/2006 | Huang et al. | 362/652 |
| 7,527,510 B2 * | 5/2009 | Yoo | 439/232 |
| 7,530,828 B2 * | 5/2009 | Miyazono | 439/232 |
| 7,591,695 B2 * | 9/2009 | Handa et al. | 439/856 |
| 7,604,494 B2 * | 10/2009 | Cho et al. | 439/232 |
| 7,771,106 B2 * | 8/2010 | Yang et al. | 362/634 |
| 7,862,191 B2 * | 1/2011 | Park et al. | 362/97.1 |

FOREIGN PATENT DOCUMENTS

| | | |
|---|---|---|
| KR | 100692962 B1 | 5/2007 |
| KR | 1020070077678 A | 7/2007 |
| KR | 1020080039019 A | 5/2008 |

* cited by examiner

*Primary Examiner* — Peggy A. Neils
(74) *Attorney, Agent, or Firm* — Innovation Counsel LLP (57) ABSTRACT

A lamp socket with a decreased number of elements is presented according to one or more embodiments. The lamp socket in accordance with one embodiment of the present invention includes a power supply member. The power supply member includes a first lamp connecting terminal, a second lamp connecting terminal facing the first lamp connecting terminal and an inverter connecting terminal disposed below the first and second lamp connecting terminals. Upper end portions of the first and second lamp connecting terminals are bent in opposite directions and the first lamp connecting terminal includes a fixing protrusion protruding from an inner surface thereof facing the second lamp connecting terminal.

7 Claims, 11 Drawing Sheets

LAMP SOCKET, BACKLIGHT ASSEMBLY HAVING THE SAME AND DISPLAY DEVICE HAVING THE SAME

CROSS-REFERENCE TO RELATED APPLICATIONS

The present application claims priority under 35 U.S.C. §119 to Korean Patent Application No. 2009-0009340 filed on Feb. 5, 2009 in the Korean Intellectual Property Office (KIPO), the contents of which are herein incorporated by reference in their entirety.

BACKGROUND

1. Technical Field

Embodiments of the present invention generally relate to a lamp socket, a backlight assembly having the lamp socket and a display device having the lamp socket. More particularly, embodiments of the present invention relate to a lamp socket fixing an electrode portion of a lamp stably, a backlight assembly having the lamp socket and a display device having the lamp socket.

2. Description of the Related Art

Backlight assemblies of a liquid crystal display (LCD) device, in general, are classified as either a direct illumination type backlight assembly or an edge illumination type backlight assembly, based on the location of the light source.

A conventional backlight assembly includes a cold cathode fluorescent lamp (CCFL) as the light source. The direct illumination type backlight assembly having the CCFL includes a lamp socket to fix lamps. In order to easily fix the lamps to the bottom plate, a backlight assembly has been developed that includes a lamp socket combined with an electrode portion of the lamp through a fitting combination.

A conventional lamp socket includes a socket housing, a power supply part and a socket cover. The power supply part electrically connects an inverter with a lead wiring of the lamp. In an assembly process for the lamp socket, the power supply part is inserted into a hole formed in the socket housing, and the lead wiring is inserted into a terminal of the power supply part. The socket cover is inserted into the socket body to fix the lead wiring of the lamp to the lamp socket.

However, there are many elements on the lamp socket, and the socket cover is combined with the socket body after aligning the lamp. Thus, the assembly process is complicated.

SUMMARY

Embodiments of the present invention provide a lamp socket with decreased number of elements. Embodiments of the present invention also provide a backlight assembly having the above-mentioned lamp socket and a display device having the above-mentioned lamp socket.

A lamp socket in accordance with an embodiment of the present invention includes a power supply member. The power supply member includes a first lamp connecting terminal, a second lamp connecting terminal facing the first lamp connecting terminal and an inverter connecting terminal disposed below the first and second lamp connecting terminals. Upper end portions of the first and second lamp connecting terminal are bent in opposite directions and the first lamp connecting terminal includes a fixing protrusion protruding from an inner surface thereof facing the second lamp connecting terminal.

The fixing protrusion may include a bending portion bent from the inner surface of the first connection terminal toward the second lamp connection terminal and a protruding portion extended from an end of the bending portion. The fixing protrusion may be formed by cutting a corresponding area of the first connection terminal and bending the corresponding area toward the second lamp connection terminal. Meanwhile, the fixing protrusion may be formed by tapping an area of an outer surface of the first connection terminal toward the inner surface of the first lamp connection terminal. The area corresponds to the fixing protrusion protruding from an inner surface of the first lamp connecting terminal facing the second lamp connecting terminal.

A backlight assembly in accordance with another embodiment of the present invention includes a receiving container, a plurality of lamps, a plurality of lamp sockets, a power supply member and a power supply substrate. The receiving container includes a bottom plate having a plurality of openings and a sidewall extending from an edge of the bottom plate. Each of the lamps on the bottom plate includes a lamp body and an electrode portion on an end portion of the lamp body. The lamp sockets are received in the openings and include a power supply member which includes a first lamp connecting terminal, a second lamp connecting terminal facing the first lamp connecting terminal and an inverter connecting terminal disposed below the first and second lamp connecting terminals. The power supply substrate is coupled to the inverter connecting terminal to provide a lamp driving voltage to the power supply member. Upper end portions of the first and second lamp connecting terminal are bent in opposite directions and the first lamp connecting terminal including a fixing protrusion protruding from an inner surface thereof faces the second lamp connecting terminal.

A display device in accordance with still another embodiment of the present invention includes a receiving container including a bottom plate having a plurality of openings and a sidewall, a plurality of lamps on the bottom plate, a plurality of lamp sockets received in the openings, a power supply substrate, a side cover that covers the socket housings, optical sheets supported by the side cover and a display panel disposed over the optical sheets. Each of the lamps on the bottom plate includes a lamp body and an electrode portion on an end portion of the lamp body and each of the lamp sockets includes a power supply member that includes a first lamp connecting terminal, a second lamp connecting terminal facing the first lamp connecting terminal and an inverter connecting terminal disposed below the first and second lamp connecting terminals. The power supply substrate applies a lamp driving voltage to the inverter connecting terminal and a side of the power supply substrate is inserted into the inverter receiving hole. Upper end portions of the first and second lamp connecting terminal are bent in opposite directions and the first lamp connecting terminal includes a fixing protrusion protruding from an inner surface thereof facing the second lamp connecting terminal.

BRIEF DESCRIPTION OF THE DRAWINGS

The above and other advantages of the present disclosure will become more apparent by describing in detail embodiments thereof with reference to the accompanying drawings, in which.

DETAILED DESCRIPTION

The disclosure is described more fully hereinafter with reference to the accompanying drawings, in which embodiments of the invention are shown. This disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. In the drawings, the size and relative sizes of layers and regions may be exaggerated for clarity.

Hereinafter, embodiments of the present invention will be described in detail with reference to the accompanying drawings.

Figure 1:
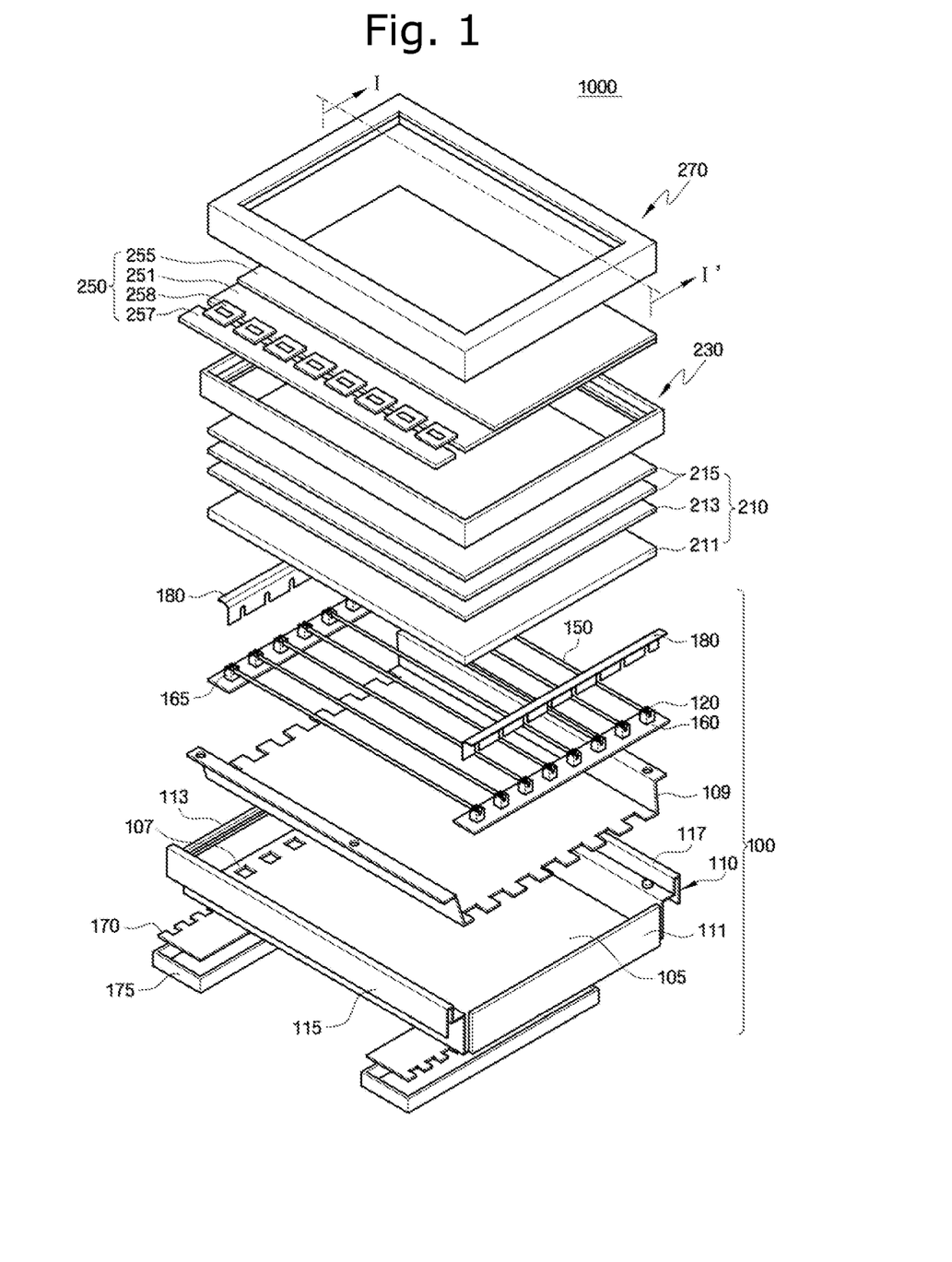
FIG. 1 is an exploded perspective view of a display in accordance with one embodiment of the present invention.
Figure 2:
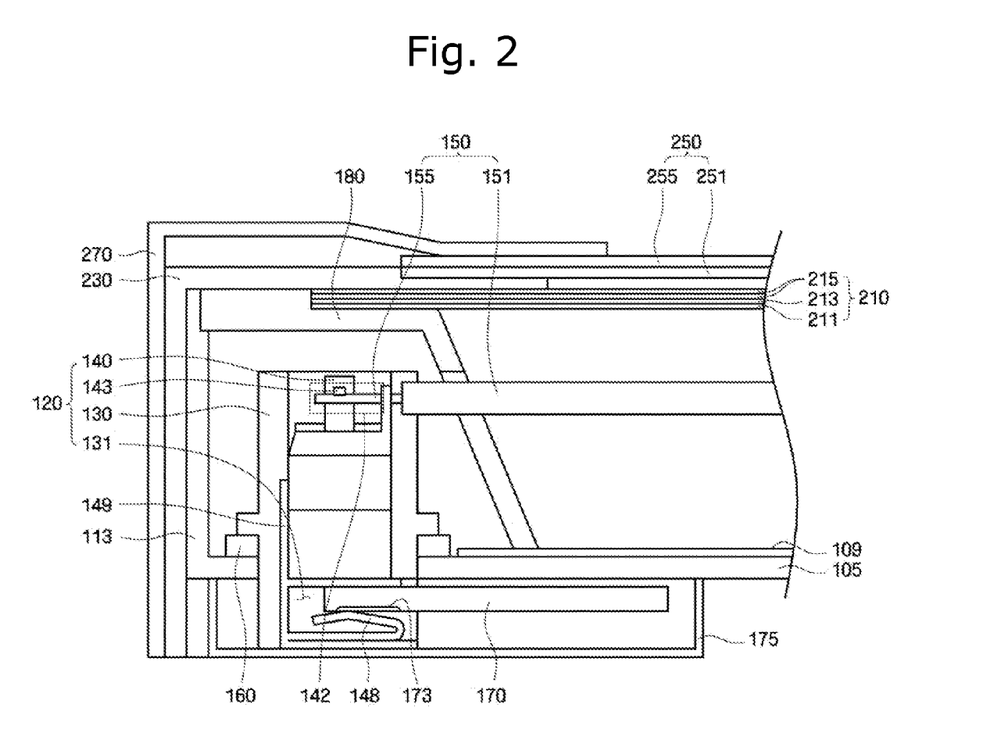
FIG. 2 is a cross-sectional view taken along a line I-I' shown in FIG. 1 according to an embodiment.
Figure 3:
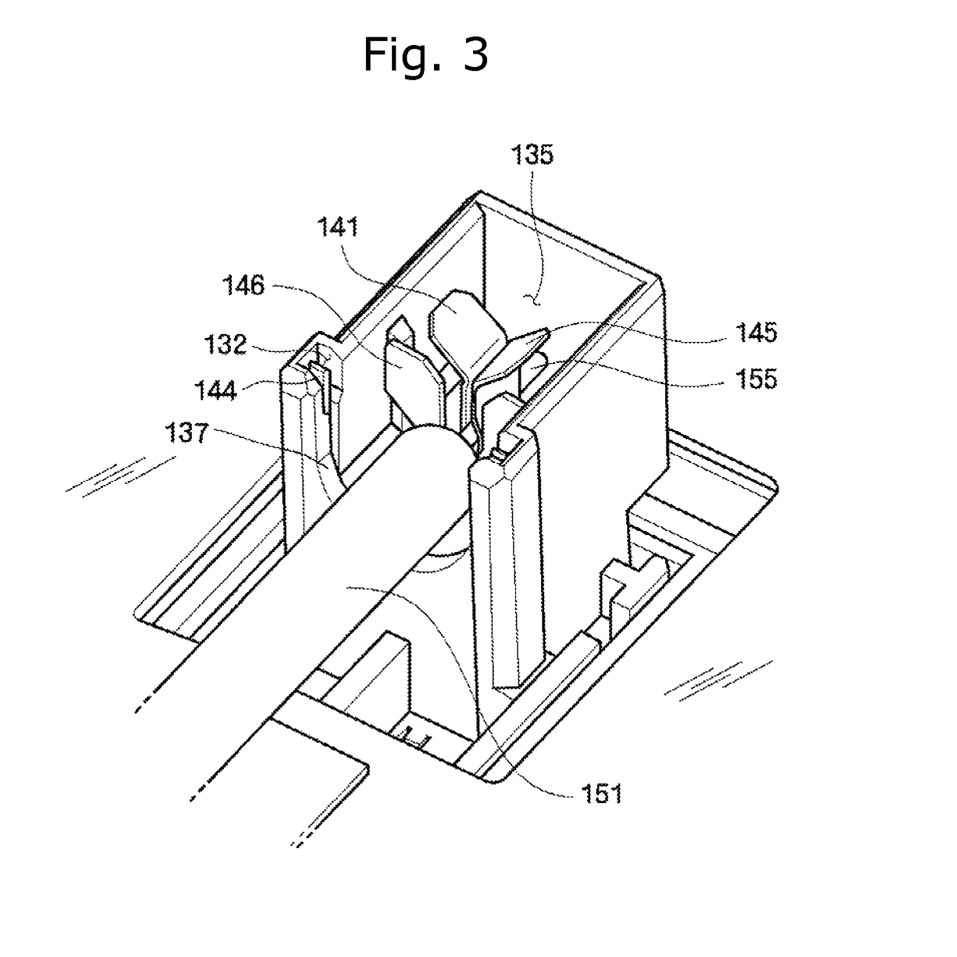
FIG. 3 is a perspective view illustrating a lamp socket shown in FIG. 1 according to an embodiment.

FIG. 1 is an exploded perspective view of a display in accordance with one embodiment of the present invention, FIG. 2 is a cross-sectional view taken along a line I-I' shown in FIG. 1 according to an embodiment, and FIG. 3 is a perspective view illustrating a lamp socket shown in FIG. 1 according to an embodiment.

Referring to FIGS. 1 through 3, the display device 1000 includes a backlight assembly 100, optical sheets 210 and a display panel 250. The backlight assembly 100 includes a receiving container 110, a plurality of lamp sockets 120, a plurality of lamps 150, a connecting plate 160, a power supply substrate 170 and a side cover 180.

The receiving container 110 includes a bottom plate 105, a first sidewall 111, a second sidewall 113, a third sidewall 115 and a fourth sidewall 117. The first, second, third and fourth sidewalls 111, 113, 115 and 117 extend from the edges of the bottom plate 105 to form a receiving space. The first and second sidewalls 111 and 113 are parallel to each other. The third and fourth sidewalls 115 and 117 are parallel to each other and connected between the first and second sidewalls 111 and 113. A stepped portion may be formed on an upper portion of the first, second, third and fourth sidewalls 111, 113, 115, and 117. A plurality of openings 107 is formed on the bottom plate 105 along the first and second sidewalls 111 and 113.

The lamp socket 120 fixes a plurality of lamps to a receiving container, and applies a lamp driving voltage to the lamps. The socket housing 130 may be formed through an injection molding process, and may have a substantially parallelepiped shape. A connecting hole 135 may be formed on an upper portion of the socket housing 130, and an inverter receiving hole 131 connected to the connecting hole 135 may be formed on a lower portion of the socket housing 130. For example, the inverter receiving hole 131 may be opened toward the lower portion of the socket housing 130, and the connecting hole 135 is opened toward the upper portion of the socket housing 130. In addition, the inverter receiving hole 131 and the connecting hole 135 may be opened toward opposite sides of the socket housing 130. A catching protrusion may protrude along side surfaces of the socket housing 130 to be combined with an external element. A lamp guide groove 137 having a round shape is formed on the upper portion of the socket housing 130. The lamp guide groove 137 is adjacent to the connecting hole 135.

The power supply part 140 is inserted into the socket housing 130 from the inverter receiving hole 131, and exposed through the connecting hole 135. The power supply part 140 includes a metal or other materials with a good conductivity so that an inverter may be electrically connected to an electrode portion of the lamp. The power supply part 140 includes a first lamp connecting terminal 141 and a second lamp connecting terminal 145. The power supply part 140 may further include an inverter connecting terminal 148 that is integrally formed with the first and second lamp connecting terminals 141 and 145. The first and second connecting terminals 141, 145 are bent in opposite directions. With this structure the area where the connecting terminals 141,145 face each other is easily opened by pushing the ends of the connecting terminals 141,145, so the first and second connecting terminals 141,145 may be easily opened by, for example, a jig or a hand. The inverter connecting terminal 148 is exposed through the inverter receiving hole 131, and the first and second lamp connecting terminals 141 and 145 are exposed through the connecting hole 135. An electrode stopper 146 is disposed in front of the lamp connecting terminals 141,145 and integrally formed with the lamp connecting terminals 141,145. Fixing protrusions 143 are formed on inner surfaces of the first and second lamp connecting terminals. The fixing protrusions 143 protrude from inner surfaces of the lamp connecting terminals 141,145 and prevent the lamp electrodes 155 from moving excessively in a lamp electrode fixing area 142. The electrode stopper 146 supports lamp electrodes 155 when lamps are disposed on the lamp sockets 120 in the automated backlight assembly process. A fixing plate 144 may be disposed in front of the electrode stopper 146. The fixing plate 144 fixes the power supply part 140 to the socket housing 130 more firmly. The power supply part 140 may further include a connecting part 149 that is integrally formed with the inverter connecting terminal 148 and the first and second lamp connecting terminals 141 and 145. The connecting part 149 may have a planar shape and may electrically connect the inverter connecting terminal 148 with the first and second lamp connecting terminals 141 and 145. The first lamp connecting terminal 141 may be substantially perpendicular to the connecting part 149, and may be connected to a left side of the connecting part 149. The second lamp connecting terminal 145 may be substantially perpendicular to the connecting part 149, and may be connected to a right side of the connecting part 149. A more detailed description of the lamp socket 120 is described below with reference to FIGS. 4 through 11 according to one or more embodiments.

The lamps 150 are combined with the lamp sockets 120. The lamps 150 are aligned on the bottom plate 105 to generate light. For example, the lamps 150 may be aligned in a direction substantially parallel to the first and second sidewalls 111 and 113.

Each of the lamps 150 includes a lamp body 151 and an electrode portion 155. The lamp body 151 may have a cylindrical shape, and a discharge gas may be injected into the lamp body 151. The electrode portion 155 is disposed on an end portion of the lamp body 151. The electrode portion 155 may include a discharge electrode and a lead wire. The discharge electrode may be disposed in the lamp body 151, and the lead wire may extend from the discharge electrode toward the exterior of the lamp body 151. Alternatively, the lamp 150 may include an EEFL.

The backlight assembly 100 may further include a connecting plate 160. The connecting plate 160 may have a plate shape and may extend in a predetermined direction. A plurality of socket fixing portions 165 is formed on the connecting plate 160, and may be spaced apart from one another by a substantially constant distance. For example, the socket fixing portions 165 may be openings formed through the connecting plate 160. Alternatively, the socket fixing portions 165 may be grooves extending along the length of the connecting plate 160. Each of the lamp sockets 120 is inserted into each of the openings formed through the connecting plate 160. The connecting plate 160 is adjacent to the first and second sidewalls 111 and 113 when the backlight assembly 100 is assembled. The lamp sockets 120 inserted into the openings of the connecting plate 160 extend through a plurality of openings 107 in the bottom plate 105. The inverter receiving hole of the lamp socket 120 is below the bottom plate 105, and the connecting hole of the lamp socket 120 is above the bottom plate 105.

The backlight assembly 100 may further include a reflecting plate 109. The reflecting plate 109 is disposed on the bottom plate 105 of the receiving container 110 to reflect the light generated from the lamps 150 toward an upper portion of the backlight assembly 100.

The power supply substrate 170 is disposed on the lower surface of the bottom plate 105 to generate a lamp driving voltage. The power supply substrate 170 may include a printed circuit board (PCB) and a power supply element mounted on the PCB.

A side of the power supply substrate 170 is inserted into the inverter receiving holes of the lamp sockets 120. The side of the power supply substrate 170 corresponding to the inverter receiving holes of the lamp socket 120 extends toward the inverter receiving holes. Thus, the side of the power supply substrate 170 has notches when viewed in plan view.

Output terminals 173 are formed on protruding portions on the side of the power supply substrate 170. The output terminals may be formed by partially exposing conductive lines that are formed on the PCB.

The backlight assembly 100 may further include a protecting casing 175 that protects the power supply substrate 170 and blocks electromagnetic interference.

The backlight assembly 100 may further include a plurality of side covers 180.

The side covers 180 are disposed on the first and second sidewalls 111 and 113 to cover the lamp sockets 120 adjacent to the first and second sidewalls 111 and 113 and to protect the lamp sockets 120.

The optical sheets 210 may improve optical characteristics of the light generated from the lamps 150. The optical sheets 210 include a diffusion plate 211, a diffusion sheet 213 and a prism sheet 215 that are stacked in sequence. The diffusion plate 211, the diffusion sheet 213 and the prism sheet 215 may be supported by the stepped portions formed on the third sidewall 115, the fourth sidewall 117 and the side cover 180.

The diffusion plate 211 diffuses the light generated from the lamps 150 to increase the luminance uniformity of the light. The diffusion sheet 213 also diffuses the light that passed through the diffusion plate 211. The prism sheet 215 guides the diffused light toward the front of the backlight assembly 100, thereby improving luminance when viewed on a plane.

The display device 1000 may further include a middle frame cover 230. The middle frame cover 230 covers a peripheral portion of the optical sheets 210, and is combined with the receiving container 110.

The display panel 250 displays an image using the light that passed through the optical sheets 210. The display panel 250 includes a first substrate 251, a second substrate 255 and a liquid crystal layer (not shown) between the two substrates 251, 255. The second substrate 255 is substantially parallel to the first substrate 251. The liquid crystal layer is interposed between the first and second substrates 251 and 255.

The display device 1000 may further include a panel PCB 257 and a connecting film 258. The panel PCB 257 applies panel driving signals to the display panel 250. The connecting film 258 is electrically connected between the first substrate 251 and the panel PCB 257.

The display device 1000 may further include a top chassis 270 combined with the receiving container 110 or the middle frame 230, and has an opening through which an effective display region of the display panel 250 is exposed.

Figure 4:
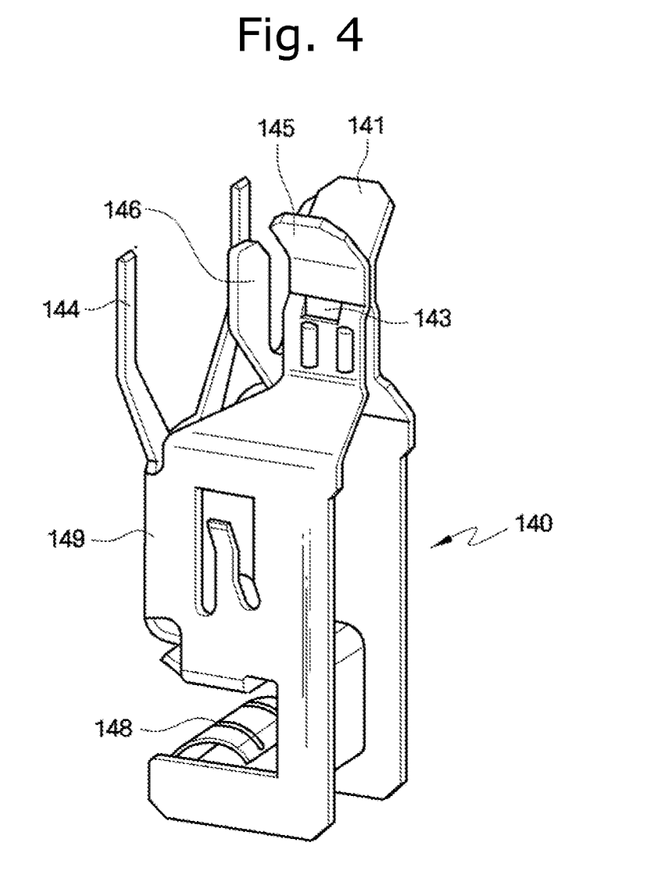
FIG. 4 is a perspective view illustrating a power supply part shown in FIG. 1 according to an embodiment.
Figure 5:
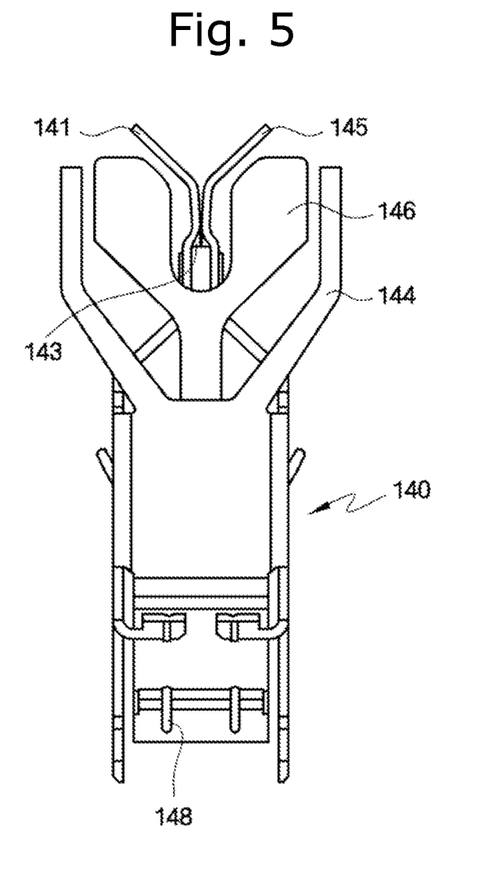
FIG. 5 is a front view illustrating a power supply part shown in FIG. 1 according to an embodiment.

FIG. 4 is a perspective view illustrating a power supply part shown in FIG. 1 according to an embodiment, and FIG. 5 is a front view illustrating a power supply part shown in FIG. 1 according to an embodiment.

Referring to FIGS. 4 and 5, the power supply part 140 includes the first lamp connecting terminal 141, the second lamp connecting terminal 145 and inverter connecting terminal 148. The first lamp connecting terminal 141 and the second lamp connecting terminal 145 are bent in opposite directions. The first and second lamp connecting terminal 141,145 and the inverter connecting terminal 148 may be formed integrally with each other. The process of producing the power supply part 140 may include pressing a conductive material for providing a base plate and bending the base plate for completing the structure of the power supply part 140. The electrode stopper 146 disposed in front of the lamp connecting terminals 141,145 may be integrally formed with the lamp connecting terminals. The electrode stopper 146 may have a groove to support a lamp electrode. A fixing plate 144 may be disposed in front of the electrode stopper 146. The fixing plate 144 may have an opening so the fixing plate does not interfere with a lamp body of a lamp fixed to the lamp socket 120. A socket housing 130 has a groove 132 for receiving the fixing plate 144 as described in the embodiment of FIG. 3. The outer surface of the side portion of the fixing plate 144 is sufficiently in contact with an inner surface of the groove 132 so the power supply part 140 is fixed to the socket housing 130 firmly, and a stress to the power supply part 140 is dispersed to the socket housing 130 through the contact area. The first and second lamp connecting terminal 141,145 has a lamp electrode fixing area 142. Fixing protrusions 143 are formed on inner surfaces of the lamp connecting terminal 141,145 facing each other and formed below the upper end of the fixing area 142. The fixing protrusions 143 prevent the lamp electrode 155 from being separated from the lamp socket 120, and prevent the lamp electrodes 155 from moving excessively in lamp electrode fixing area 142.

Figure 6:
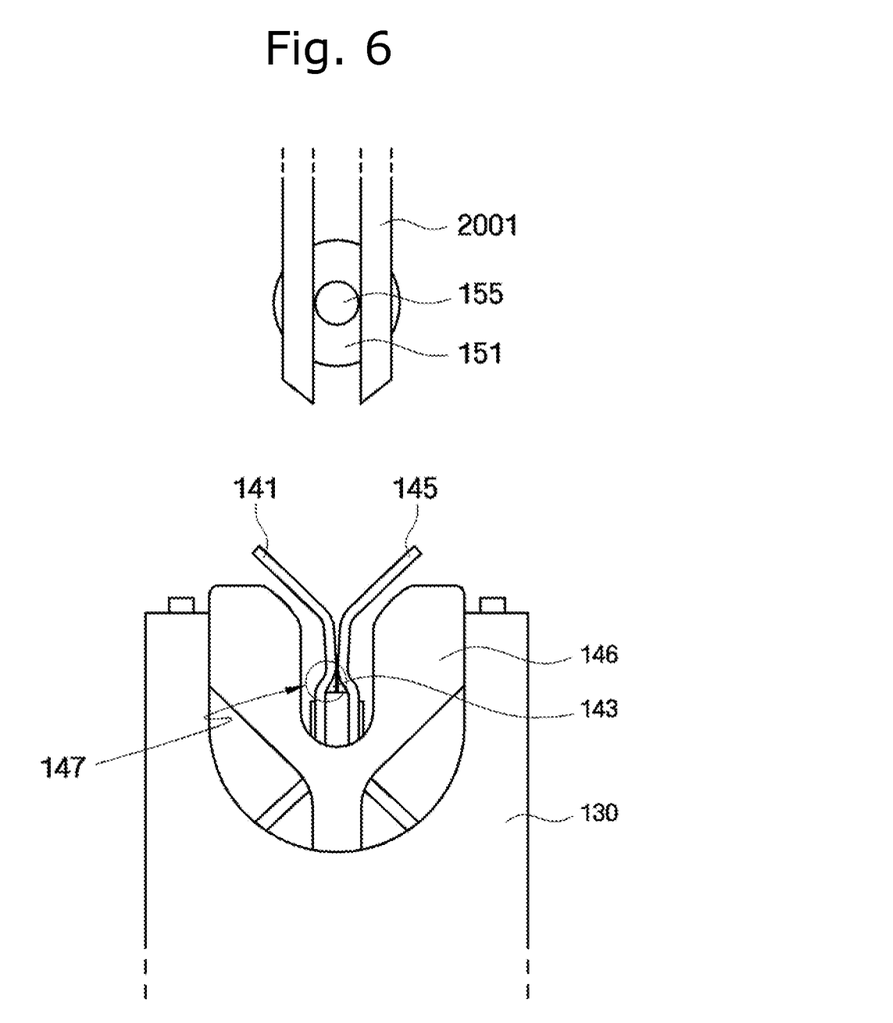
FIG. 6 is a cross-sectional view illustrating a method of assembling a lamp with the lamp socket shown in FIG. 1 according to an embodiment.
Figure 7:
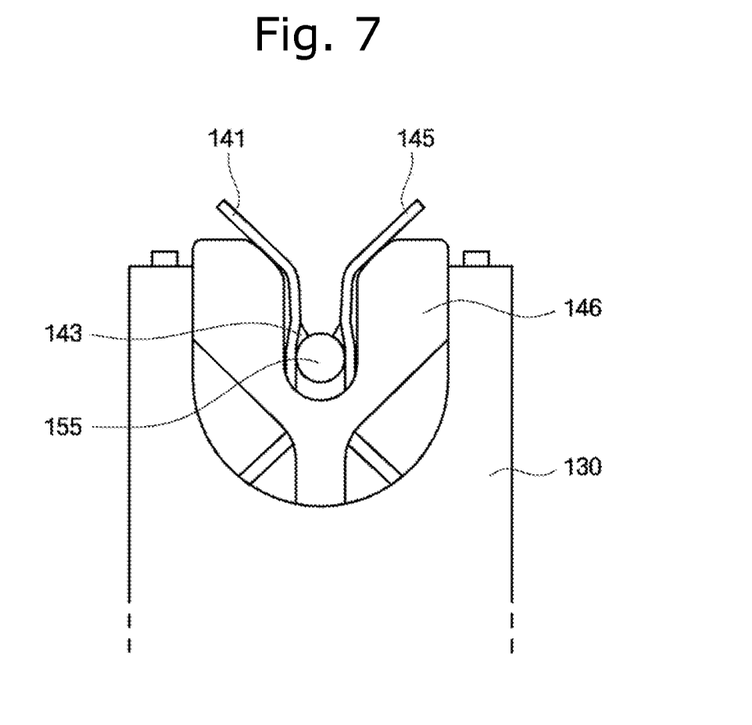
FIG. 7 is a cross-sectional view illustrating the lamp socket of FIG. 6 receiving an electrode of a lamp according to an embodiment.

FIG. 6 is a cross-sectional view illustrating a method of assembling a lamp with the lamp socket shown in FIG. 1 according to an embodiment, and FIG. 7 is a cross-sectional view illustrating the lamp socket of FIG. 6 receiving an electrode of a lamp according to an embodiment.

Referring to FIGS. 6 to 7, the lamp 150 is disposed in the lamp socket 120 by a jig 2001 of an automated backlight assembling machine. The jig 2001 loads the electrode 155 of the lamp 150 and pushes upper surfaces of the lamp connecting terminal 141,145. When a distance between the first lamp connecting terminal 141 and the second lamp connecting terminal 145 becomes longer than a diameter of the electrode 155, the jig 2001 unloads the lamp 150 to the lamp socket 120. The lamp 150 falls down to the lamp electrode fixing area 142 until the lamp electrode 155 contacts the electrode stopper 146. When the jig 2001 is removed, connecting terminals 141,145 retract securing electrode 155 to the lamp socket 120.

During an assembling process of a display module or transportation of the display module, the electrode 155 may be separated from the lamp socket 120 or moved excessively in a lamp electrode fixing area 142. The electrode stopper 146 provides a lower limit in the lamp electrode fixing area 142. A guiding groove may be formed on an upper surface of the electrode stopper 146 and a width of an upper portion of the groove is longer than the diameter of the electrode 155. The upper portion of the lamp electrode fixing area 142 includes a fixing protrusion 143 providing an upper limit in the lamp electrode fixing area 142. The lamp connection terminals 141,145 may have a stepped portion 147 for receiving the electrode 155. The electrode 155 may not be effectively gripped only by adding stepped portion 147. If the electrode 155 moves excessively, the lamp body may contact a side cover. The area contacting the side cover transmits heat of a lamp body to the side cover so the temperature of the side cover increases. As a result, a difference in temperature between an end portion of the lamp covered by the side cover and a center portion of the lamp becomes greater after the lamp turns on. This heat unbalance may result in damage to the lamp.

The fixing protrusion 143 protruding from inner surfaces of the lamp connection terminals 141,145 may contact an upper surface of the electrode 155. The fixing protrusion 143 increases grip strength of the power supply part 140. Especially the fixing protrusion 143 increases grip strength against pull strength from an upper direction because the fixing protrusion 143 increases contact areas close to the upper center portion of the electrode 155 to resist efficiently against the pull strength.

Figure 8:
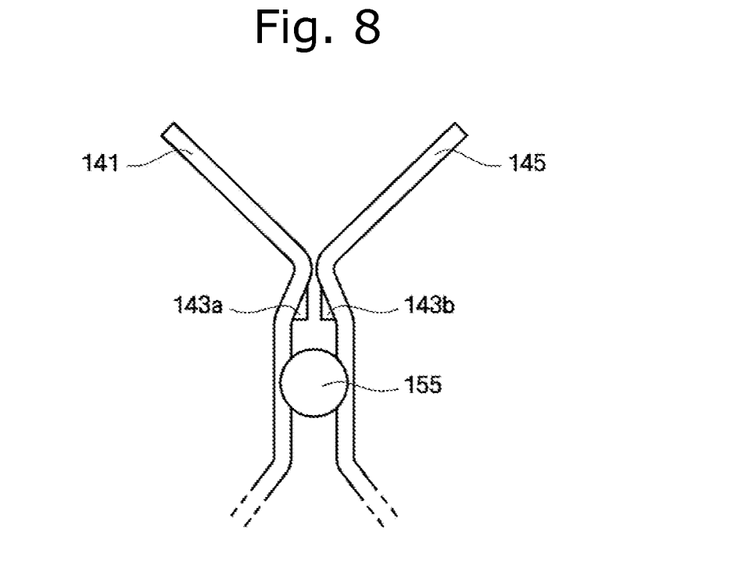
FIG. 8 is a cross-sectional view illustrating a power supply part receiving an electrode of a lamp in accordance with one embodiment of present invention.
Figure 9:
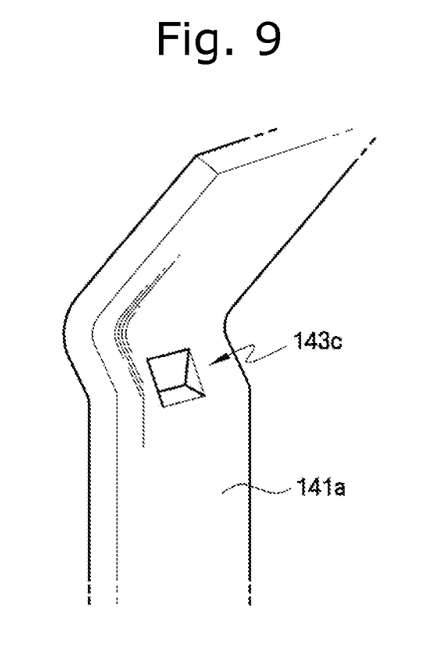
FIG. 9 is a perspective view of the lamp connecting terminal shown in FIG. 8 according to an embodiment.

FIG. 8 is a cross-sectional view illustrating a power supply part receiving an electrode of a lamp in accordance with one embodiment of present invention, and FIG. 9 is a perspective view of the lamp connecting terminal shown in FIG. 8 according to an embodiment.

Referring to FIGS. 8 and 9, the fixing protrusions 143a, 143b protrude from inner surfaces of the first and second connecting terminals 141,145. The fixing protrusion 143a is formed by tapping an area 143c of an outer surface 141a of the second connection terminal 141 toward the inner surface of the second lamp connection terminal, so the area corresponds to the fixing protrusion 143a protruding from an inner surface of the second lamp connecting terminal facing the first lamp connecting terminal. The fixing protrusion 143a may be formed, for example, as a hemisphere shape, prism shape or pyramid shape. To increase grip strength of the terminals 141,145, the form of the fixing protrusion 143a should increase contact areas close to the upper center portion of the electrode 155 to resist efficiently against the pull strength. For example, a hemisphere shaped fixing protrusion may have at least two curved surfaces, a first and second curved surface. The first curved surface facing downside having a first curvature and the second curved surface facing upside having a second curvature and the second curvature is smaller than the first curvature. Alternatively, the fixing protrusion may have a prism shape having a first and second inclined plane. The first inclined plane facing downside and the second inclined plane facing upside and a gradient of the first inclined plane is steeper than a gradient of the second inclined plate. With this structure, the upper surface of the electrode 155 has increased areas contacting the fixing protrusion 143a, 143b so the terminals 141,145 efficiently grip the electrode 155 when a pull strength is inflicted to the electrode 155.

Figure 10:
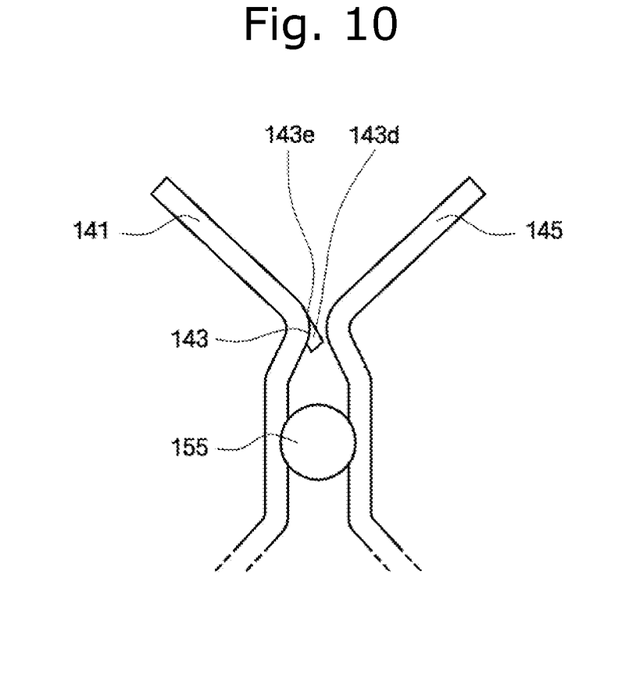
FIG. 10 is a cross-sectional view illustrating a power supply part receiving an electrode of a lamp in accordance with one embodiment of present invention.
Figure 11:
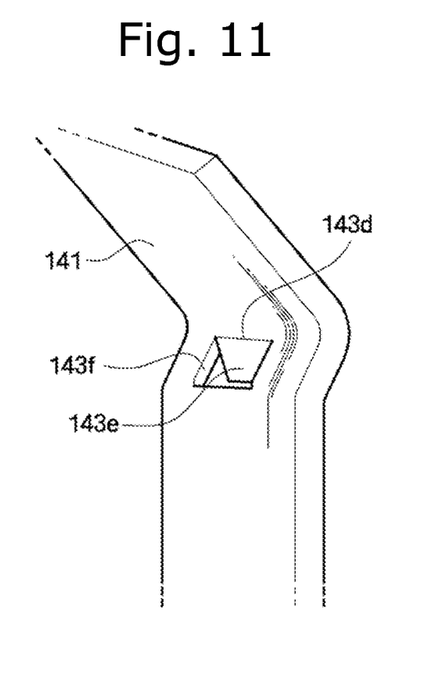
FIG. 11 is a perspective view of the lamp connecting terminal shown in FIG. 10 according to an embodiment.
Figure 12:
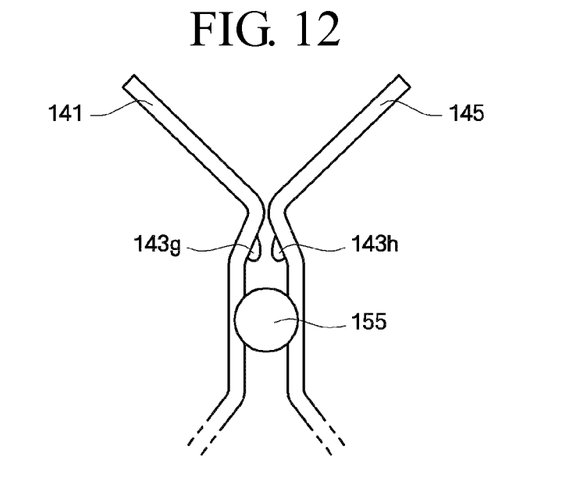
FIG. 12 is a cross-sectional view illustrating a power supply part receiving an electrode of a lamp in accordance with one embodiment of present invention.
Figure 13:
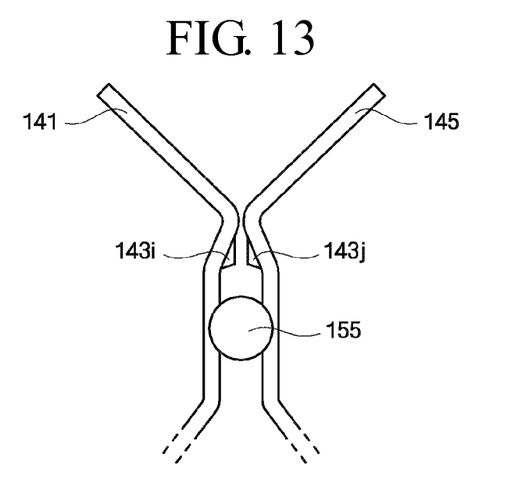
FIG. 13 is a cross-sectional view illustrating a power supply part receiving an electrode of a lamp in accordance with one embodiment of present invention.

FIG. 10 is a cross-sectional view illustrating a power supply part receiving an electrode of a lamp in accordance with one embodiment of present invention, and FIG. 11 is a perspective view of the lamp connecting terminal shown in FIG. 10 according to an embodiment.

Referring to FIG. 10 and FIG. 11, the fixing protrusion 143 includes a bending portion 143e that extends from the inner surface of the first connection terminal 141 toward the second lamp connection terminal 145 and a protruding portion 143d that extends from an end of the bending portion 143e. The fixing protrusion 143 may be formed by cutting a boundary of an area 143f that corresponds to the fixing protrusion 143 of the first connection terminal 141 and bending the area 143f toward the second lamp connection terminal 145. The bending portion 143e is bent obliquely toward the second lamp connection terminal 145 and an edge of the protruding portion 143d opposite the bending portion and faces downward obliquely. If the protruding portion 143d is bent more than 90 degrees, the fixing protrusion 143 may contact only a side surface of the electrode 155. So the fixing protrusion may not grip the electrode 155 effectively against the pull strength inflicted upon the electrode 155 from an upper direction. If the bending portion 143e is bent obliquely downward, the upper surface of the electrode 155 may have increased areas contacting the fixing protrusion 143d and the distance between the terminals 141, 145 is shorter than the radius of the electrode 155, so the terminals 141,145 efficiently grip the electrode 155 when a pull strength is inflicted on the electrode 155.

According to an embodiment of the present invention, a lamp socket includes two elements: a socket housing and a power supply member. A socket cover, which is part of a conventional lamp socket, may be omitted. Thus, embodiments of the present disclosure decrease the number of elements of the lamp socket, a power supply module, a backlight assembly and a display device. In addition, first and second lamp connecting terminals of the power supply member are not pressed by the lamp socket, and the shape of the first and second lamp connecting terminals may be adjusted so that the lamps may be loaded through an automated assembly process. Therefore, any defect that would be caused by pressing a socket cover during the automated assembly process may be prevented.

This disclosure has been described with reference to exemplary embodiments. However, many modifications and variations will be apparent to those skilled in the art in light of the foregoing description. Accordingly, the present disclosure embraces all such modifications and variations that fall within the spirit and scope of the appended claims.

What is claimed is:

1. A lamp socket comprising:
a power supply member including:
a first lamp connecting terminal; and a second lamp connecting terminal facing the first lamp connecting terminal, wherein upper end portions of the first and second lamp connecting terminals extend away from each other and the first lamp connecting terminal comprises a fixing protrusion protruding from an inner surface thereof facing the second lamp connecting terminal, wherein the first lamp connecting terminal and the second lamp connecting terminal are configured to be connected to a same lamp electrode, wherein the fixing protrusion comprises a first curved surface facing downward having a first curvature and a second curved surface facing upwards having a second curvature, and wherein the second curvature is smaller than the first curvature.

2. The lamp socket of claim 1, wherein the fixing protrusion includes a bending portion bent from the inner surface of the first lamp connection terminal toward the second lamp connection terminal and a protruding portion extending from an end of the bending portion.

3. The lamp socket of claim 2, wherein the bending portion forms a corner that points toward the second lamp connection terminal and an edge of the protruding portion opposite to the bending portion faces downwards at an oblique angle.

4. The lamp socket of claim 1, wherein the fixing protrusion is formed by indenting an area of an outer surface of the first connection terminal toward the inner surface of the first lamp connection terminal, wherein the area corresponds to the fixing protrusion protruding from an inner surface of the first lamp connecting terminal facing the second lamp connecting terminal.

5. A lamp socket comprising:
a power supply member including:
a first lamp connecting terminal; and
a second lamp connecting terminal facing the first lamp connecting terminal, wherein upper end portions of the first and second lamp connecting terminals extend away from each other and the first lamp connecting terminal comprises a fixing protrusion protruding from an inner surface thereof facing the second lamp connecting terminal, wherein the first lamp connecting terminal and the second lamp connecting terminal are configured to be connected to a same lamp electrode, wherein the fixing protrusion is formed by indenting an area of an outer surface of the first connection terminal toward the inner surface of the first lamp connection terminal, wherein the area corresponds to the fixing protrusion protruding from an inner surface of the first lamp connecting terminal facing the second lamp connecting terminal, wherein the fixing protrusion includes a first inclined plane facing downward and a second inclined plane facing upwards, and wherein a gradient of the first inclined plane is steeper than a gradient of the second inclined plane.

6. A backlight assembly comprising:
a receiving container comprising a bottom plate having a plurality of openings and a sidewall extending from an edge of the bottom plate;
a plurality of lamps on the bottom plate, each of the lamps comprising a lamp body and an electrode portion on an end portion of the lamp body;
a plurality of lamp sockets located in the openings, each of the lamp sockets comprising:
a power supply member comprising:
a first lamp connecting terminal;
a second lamp connecting terminal facing the first lamp connecting terminal; and
an inverter connecting terminal disposed below the first and second lamp connecting terminals; and
a power supply substrate coupled to the inverter connecting terminal to provide a lamp driving voltage to the power supply member, wherein upper end portions of the first and second lamp connecting terminals extend away from each other and the first lamp connecting terminal includes a fixing protrusion protruding from an inner surface thereof facing the second lamp connecting terminal, wherein the first lamp connecting terminal and the second lamp connecting terminal are configured to be connected to a same lamp electrode, wherein the fixing protrusion comprises a first curved surface facing downward having a first curvature and a second curved surface facing upwards having a second curvature, and wherein the second curvature is smaller than the first curvature.

7. A lamp socket comprising:
a power supply member including:
a first lamp connecting terminal; and
a second lamp connecting terminal facing the first lamp connecting terminal, wherein upper end portions of the first and second lamp connecting terminals extend away from each other and the first lamp connecting terminal comprises a fixing protrusion protruding from an inner surface thereof facing the second lamp connecting terminal, wherein the first lamp connecting terminal and the second lamp connecting terminal are configured to be connected to a same lamp electrode, wherein the fixing protrusion includes a bending portion bent from the inner surface of the first lamp connection terminal toward the second lamp connection terminal and a protruding portion extending from an end of the bending portion, wherein the fixing protrusion includes a first inclined plane facing downward and a second inclined plane facing upwards, and wherein a gradient of the first inclined plane is steeper than a gradient of the second inclined plane.

* * * * *